United States Patent

[11] 3,617,607

[72] Inventor Jack D. Williams
Raleigh, N.C.
[21] Appl. No. 53,726
[22] Filed July 10, 1970
[45] Patented Nov. 2, 1971
[73] Assignee The United States of America as represented by the Secretary of the Air Force

[54] ELECTROMAGNETIC INTERFERENCE SHIELD ISOLATOR
2 Claims, 2 Drawing Figs.

[52] U.S. Cl. .......... 174/35 C, 174/88 C, 333/24 C, 333/98 R, 339/177 R
[51] Int. Cl. .......... H02g 15/08
[50] Field of Search .......... 174/35 R, 35 C, 35 MS, 75 C, 88 C, 89; 339/143 R, 147 R, 177; 333/12, 24 C, 98 R

[56] References Cited

UNITED STATES PATENTS

| | | | |
|---|---|---|---|
| 2,332,952 | 10/1943 | Tischer | 333/12 |
| 2,379,800 | 7/1945 | Hare | 333/24 C UX |
| 2,602,118 | 7/1952 | Adams et al. | 333/24 C |

FOREIGN PATENTS

| | | | |
|---|---|---|---|
| 689,619 | 6/1964 | Canada | 174/85 |

*Primary Examiner*—Darrell L. Clay
*Attorneys*—Harry A. Herbert, Jr. and George Fine

ABSTRACT: An electromagnetic interference shield isolator apparatus for coupling the shielded cables having a capacitor built into the coupler assembly to isolate the shield cables from each other with respect to both DC and RF interferences.

PATENTED NOV 2 1971 3,617,607

INVENTOR.
JACK D. WILLIAMS
BY Harry A. Herbert Jr. and George Fine
ATTORNEYS

ELECTROMAGNETIC INTERFERENCE SHIELD ISOLATOR

BACKGROUND OF THE INVENTION

This invention relates broadly to an electromagnetic interference device and in particular to an electromagnetic interference shield isolator apparatus to provide optimum RF coupling and yet maintain an effective RF shield.

Electronic systems which are utilized in the presence of large magnetic and/or electric fields require shielding in order to function properly. Generally, in a given system environment both magnetic and electric fields are present. The ideal shielding configuration for the rejection of one type of field requires a compromise in the shielding configuration for the rejection of the other type of field. It is well known that the optimum shield configuration for a large electric field may be obtained by grounding the shield at both ends of the cable. However, if magnetic fields are also present, shielding arrangement forms a loop with the ground system and results in large currents which flow in the shield. The magnetic field coupling may be reduced by opening this current loop however the electric field coupling will increase.

The pickup of E- and H-fields is a function of the circuit impedance at the frequency of interest. If a capacitor is utilized on the signal wire, it will not prevent the H-field from coupling to the shield which can then be coupled by the E-field and thus cause harmonics which may be coupled through the capacitor. The installation of a conventional capacitor in series with the shield will reduce the H-field (low frequency) pickups. However this presents two additional problems. The shield must be continuous and terminate in a 360° arc to be an effective electromagnetic interference barrier. The insertion of any single lead device in a coaxial cable prevents a full 360° electromagnetic interference shield. It will also present a discontinuity which will cause signal degradation and/or an impedance change which will tend to negate its usefulness. An additional possible solution would be to enclose the cable in a magnetic material to form a conduit or shield. However, this solution is not practical for use in an aircraft or space vehicle due to the increased weight factor. The present disadvantages can be eliminated through the utilization of the instant invention which is a combination shield coupler and DC isolator.

SUMMARY OF THE INVENTION

The present invention utilizes a capacitor which is part of the cable connector shell and is connected to the cable shield. The use of a capacitor as a coupler provides an effective block to any DC currents which may be present in the cable shield and thereby the shield isolator performs a DC isolating function. The size of the capacitor will be determined by the frequency of the magnetic field which is to be rejected by the shield isolator functioning as an RF coupler.

It is one object of the invention, therefore, to provide an improved shield isolator apparatus having an effective low-frequency magnetic-field rejection.

It is another object of the invention to provide an improved shield isolator apparatus having DC and low-frequency isolation in the cable ground-shield system.

It is yet another object of the invention to provide an improved shield isolator apparatus having optimum RF coupling and maintaining an effective RF interference shield.

These and other advantages, features and objects of the invention will become more apparent from the following description taken in connection with the illustrative embodiment in the accompanying drawing.

DESCRIPTION OF PREFERRED EMBODIMENT

Figure 1:
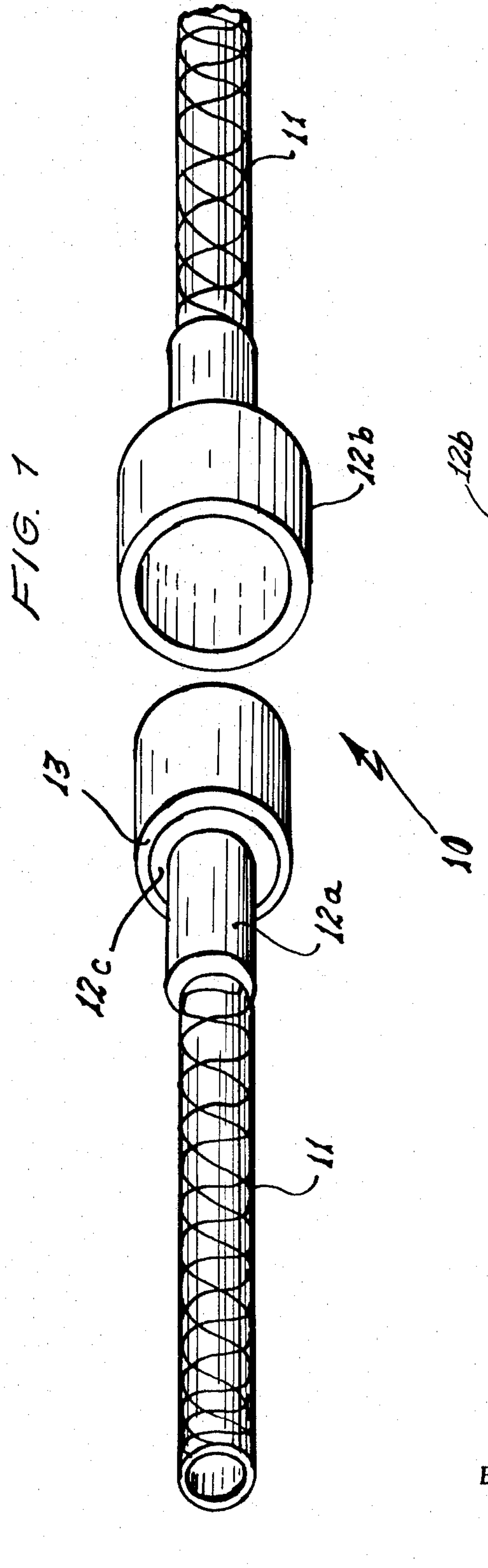
FIG. 1 is a pictorial representation of the electromagnetic interference shield isolator apparatus in accordance with this invention; and, FIG. 2 is a longitudinal cross-sectional view of the assembled electromagnetic interference shield isolator apparatus.
Figure 2:
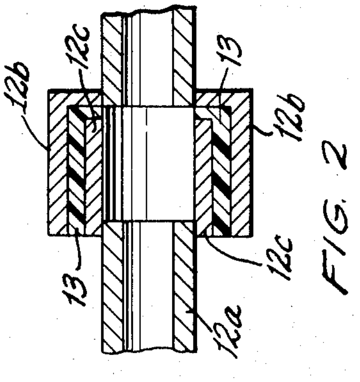

Referring now to the FIGURE, an electromagnetic interference shield isolator apparatus 10 having a braided shield 11 connected physically and electrically to the smaller tubular portions of cable connector housings 12*a*, *b*. Cable connector housing 12*a* has a thin layer of insulation material 13 which completely encompasses and isolates the enlarged portion 12*c* of cable connector housing 12*a* from any electrical contact with cable connector housing 12*b* when the housings are receptively mated within each other. An insulation material such as Mylar, Teflon may be utilized. When cable connector housing 12*c* with insulating material 13 is inserted into cable connector housing 12*b* a capacitor is formed. In FIG. 2, there is shown a longitudinal cross-sectional view of the capacitor which is formed by receptively mating cable connector housings 12*b* and *c*. The capacitor characteristics, such as its value, may vary according to the various frequencies which are required to be coupled and according to the frequencies of the magnetic and RF fields which are to be rejected. These characteristics may be altered by increasing the diameters of cable connector housings 12*a*, *b* thereby increasing their respective circumferences and thus increasing the capacitor plate area.

In general when the wires of an electronic transmission system are separated by less than a wavelength and the field impedance is greater than 377 ohms, the E-field is predominant (i.e., high voltage, low current). When the field impedance is less than 377 ohms, the H-field is predominant (i.e., low voltage, high current). Generally E-fields are RE waves. Thus, a capacitor which will present a low impedance at high frequencies and a high impedance at low frequencies may be utilized to decouple the E-field. The capacitor also would have a cutoff frequency above the magnetic-field frequency and thereby reflect a high impedance to the H-field. Thus, a capacitor formed in this manner provides an electromagnetic interference shield which would be continuous and would terminate in a 360 ° arc thereby being an effective electromagnetic interference barrier. The present invention overcomes the problem in the prior art devices of discontinuity which causes signal degradation and, or alternatively, an impedance change which affects the effectiveness of the device. The use of a built-in capacitor in a shield configuration provides a shield isolator which is small and weight is a few ounces and is practical for use in an aircraft or space vehicle. While the shield isolator has been shown for individual shielded lines, it may be especially useful for gross shield cables between systems and subsystems where long runs which are adjacent to high-current-carrying conductors are required.

While in accordance with the provisions of the statutes, we have illustrated and described in the best forms of the invention now known to us, it will be apparent to those skilled in the art that changes may be made in the form of the apparatus disclosed without departing from the spirit of the invention as set forth in the appended claims, and that is some cases certain features of the invention may be used to advantage without a corresponding use of other features.

I claim:

1. An electromagnetic interference shield isolator apparatus interconnecting the braided cable shield of coupled shielded cables comprising in combination:

a first cable connector housing having enlarged tubular portion at one end and a tubular portion of a smaller diameter at the other end, said smaller tubular portion being connected to said braided cable shield, said first cable connector housing and said braided cable shield being electrically conductive;

an insulation material encapsulating said enlarged tubular portion of said first cable connector housing; and, a second cable connector housing having an enlarged tubular portion and a smaller tubular portion, said smaller tubular portion being connected to said braided cable shield, said second cable connector housing and said braided cable shield being electrically conductive, said enlarged tubular portion of said first cable connector housing being receptively mated within said enlarged portion of said second cable connector housing.

2. An electromagnetic interference shield isolator as described in claim 1 wherein said receptively mated first and second cable connector housing comprise a capacitor having a cutoff frequency above the magnetic-field frequency.

* * * * *